(12) United States Patent
Du et al.

(10) Patent No.: US 7,522,964 B2
(45) Date of Patent: *Apr. 21, 2009

(54) LOW POWER DIGITAL AUDIO DECODING/PLAYING SYSTEM FOR COMPUTING DEVICES

(75) Inventors: Sterling Du, Palo Alto, CA (US); James Lam, Fremont, CA (US); Volodymyr Ivchenko, San Jose, CA (US); Sheau Chuen Her, Milpitas, CA (US)

(73) Assignee: O2Micro International Limited, Grand Cayman (KY)

( * ) Notice: Subject to any disclaimer, the term of this patent is extended or adjusted under 35 U.S.C. 154(b) by 767 days.

This patent is subject to a terminal disclaimer.

(21) Appl. No.: 09/969,060

(22) Filed: Oct. 2, 2001

(65) Prior Publication Data

US 2002/0077713 A1 Jun. 20, 2002

Related U.S. Application Data

(63) Continuation-in-part of application No. 09/921,171, filed on Aug. 2, 2001.

(60) Provisional application No. 60/265,466, filed on Jan. 30, 2001, provisional application No. 60/250,899, filed on Dec. 1, 2000.

(51) Int. Cl.
 *G06F 17/00* (2006.01)
(52) U.S. Cl. ...................................................... 700/94
(58) Field of Classification Search .................. 700/94; 710/14
 See application file for complete search history.

(56) References Cited

U.S. PATENT DOCUMENTS

| 4,348,696 A | 9/1982 | Bier ............................ 358/188 |
| 4,554,584 A | 11/1985 | Elam et al. ................... 358/165 |
| 4,747,041 A | 5/1988 | Engel et al. ................. 364/200 |
| 4,851,987 A | 7/1989 | Day ............................ 364/200 |
| 4,968,987 A | 11/1990 | Naka et al. ................... 341/143 |
| 4,999,634 A | 3/1991 | Brazdrum et al. ........... 341/172 |

(Continued)

FOREIGN PATENT DOCUMENTS

EP 0685824 A2 6/1995

(Continued)

OTHER PUBLICATIONS

Dictionary.com definition of Computer.*

(Continued)

*Primary Examiner*—Curtis Kuntz
*Assistant Examiner*—Andrew C Flanders

(57) ABSTRACT

A low-power digital audio decoding and playing system and method for computing devices provides a low-cost, low power-consumption, long-battery-life audio playing and decoding system, which may be used to play compressed audio files of various formats. In one aspect, a computer system adapted to play audio files comprises a system CPU, memory, at least one drive comprising compressed audio data, and an audio controller coupled to the system CPU, memory and drive. The audio controller is adapted to cause the drive to read the compressed audio data from the drive, to cause the system CPU to decompress the compressed audio data from the drive into decompressed audio data, to cause the decompressed audio to be stored in the memory, and to cause the decompressed audio data to be retrieved from the memory for playing.

13 Claims, 5 Drawing Sheets

U.S. PATENT DOCUMENTS

| | | | | |
|---|---|---|---|---|
| 5,065,309 A | 11/1991 | Putnam et al. | | 364/419 |
| 5,142,684 A | 8/1992 | Perry et al. | | 395/750 |
| 5,167,024 A | 11/1992 | Smith et al. | | 395/375 |
| 5,200,913 A | 4/1993 | Hawkins et al. | | 364/708 |
| 5,218,704 A | 6/1993 | Watts, Jr. et al. | | 395/750 |
| 5,375,076 A | 12/1994 | Goodrich et al. | | 364/708.1 |
| 5,382,983 A | 1/1995 | Kwoh et al. | | 348/716 |
| 5,386,552 A | 1/1995 | Garney | | 395/575 |
| 5,511,203 A | 4/1996 | Wisor et al. | | 395/750 |
| 5,548,777 A | 8/1996 | Woo | | 395/821 |
| 5,560,024 A | 9/1996 | Harper et al. | | 395/750 |
| 5,579,524 A | 11/1996 | Kikinis | | 395/750 |
| 5,600,800 A | 2/1997 | Kikinis et al. | | 395/281 |
| 5,619,402 A | 4/1997 | Liu | | 363/20 |
| 5,634,798 A | 6/1997 | Suh | | 434/307 |
| 5,642,417 A | 6/1997 | Stringer | | 380/4 |
| 5,646,699 A | 7/1997 | Oh et al. | | 348/553 |
| 5,671,368 A | 9/1997 | Chan et al. | | 395/282 |
| 5,692,197 A | 11/1997 | Narad et al. | | 395/750 |
| 5,696,975 A | 12/1997 | Moore et al. | | 395/712 |
| 5,699,244 A | 12/1997 | Clark, Jr. et al. | | 364/420 |
| 5,708,840 A | 1/1998 | Kikinis et al. | | 395/800 |
| 5,732,266 A | 3/1998 | Moore et al. | | 395/651 |
| 5,790,875 A | 8/1998 | Andersin et al. | | 395/750.03 |
| 5,796,705 A | 8/1998 | Kim | | 369/124 |
| 5,797,089 A | 8/1998 | Nguyen | | 455/403 |
| 5,815,679 A | 9/1998 | Liu | | 395/309 |
| 5,819,116 A | 10/1998 | Maupin et al. | | 395/888 |
| 5,822,598 A | 10/1998 | Lam | | 395/750.06 |
| 5,835,759 A | 11/1998 | Moore et al. | | 395/651 |
| 5,838,983 A | 11/1998 | Atkinson | | 395/750.06 |
| 5,870,355 A | 2/1999 | Fujihara | | 369/32 |
| 5,903,764 A | 5/1999 | Shyr et al. | | 395/750.01 |
| 5,903,871 A | 5/1999 | Terui et al. | | |
| 5,910,933 A | 6/1999 | Moore | | 369/33 |
| 5,940,854 A * | 8/1999 | Green et al. | | 711/112 |
| 5,964,878 A | 10/1999 | Ryu | | 713/323 |
| 5,969,529 A | 10/1999 | Eiraku et al. | | 324/433 |
| 5,974,549 A | 10/1999 | Golan | | 713/200 |
| 5,983,073 A | 11/1999 | Ditzik | | 455/11.1 |
| 5,999,730 A | 12/1999 | Lewis | | 395/702 |
| 6,006,285 A * | 12/1999 | Jacobs et al. | | 710/14 |
| 6,006,337 A | 12/1999 | Koo | | 713/324 |
| 6,018,724 A | 1/2000 | Arent | | 705/44 |
| 6,025,869 A | 2/2000 | Stas et al. | | |
| 6,034,621 A | 3/2000 | Kaufman | | 340/825.44 |
| 6,038,672 A | 3/2000 | Klein | | 713/322 |
| 6,047,223 A | 4/2000 | Sartori | | 700/83 |
| 6,047,342 A | 4/2000 | Depew | | 710/102 |
| 6,047,380 A | 4/2000 | Nolan et al. | | 713/324 |
| 6,061,452 A | 5/2000 | Suzuki | | 380/231 |
| 6,076,133 A | 6/2000 | Brainard et al. | | 710/260 |
| 6,088,730 A | 7/2000 | Kato et al. | | 709/227 |
| 6,088,809 A | 7/2000 | Atkinson | | 713/324 |
| 6,101,562 A | 8/2000 | Chang et al. | | 710/73 |
| 6,122,619 A * | 9/2000 | Kolluru et al. | | 704/500 |
| 6,125,417 A | 9/2000 | Bailis et al. | | 710/103 |
| 6,141,052 A | 10/2000 | Fukumitsu et al. | | 348/373 |
| 6,151,012 A | 11/2000 | Bullister | | 345/168 |
| 6,154,359 A | 11/2000 | Kamikakai et al. | | 361/681 |
| 6,173,417 B1 | 1/2001 | Merrill | | 714/15 |
| 6,195,713 B1 | 2/2001 | Chaiken et al. | | 710/19 |
| 6,202,121 B1 | 3/2001 | Walsh et al. | | 711/100 |
| 6,209,088 B1 | 3/2001 | Reneris | | 713/1 |
| 6,226,237 B1 | 5/2001 | Chan et al. | | 369/33 |
| 6,233,464 B1 | 5/2001 | Chmaytelli | | 455/556 |
| 6,252,511 B1 | 6/2001 | Mondshine et al. | | 340/636 |
| 6,259,597 B1 | 7/2001 | Anzai et al. | | 361/683 |
| 6,266,714 B1 | 7/2001 | Jacobs et al. | | 710/14 |
| 6,272,575 B1 | 8/2001 | Rajchel | | 710/102 |
| 6,292,440 B1 | 9/2001 | Lee | | 369/7 |
| 6,304,261 B1 | 10/2001 | Shields et al. | | 345/358 |
| 6,310,634 B1 | 10/2001 | Bodnar et al. | | 345/854 |
| 6,332,175 B1 * | 12/2001 | Birrell et al. | | 711/112 |
| 6,334,149 B1 | 12/2001 | Davis, Jr. et al. | | 709/219 |
| 6,336,142 B1 | 1/2002 | Kato et al. | | 709/227 |
| 6,349,386 B1 | 2/2002 | Chan | | 713/323 |
| 6,356,905 B1 | 3/2002 | Gershman et al. | | 707/10 |
| 6,370,631 B1 | 4/2002 | Dye | | 711/170 |
| 6,377,530 B1 | 4/2002 | Burrows | | 369/69.12 |
| 6,378,010 B1 | 4/2002 | Burks | | 710/68 |
| 6,378,077 B1 | 4/2002 | Atkinson | | 713/324 |
| 6,385,734 B2 | 5/2002 | Atkinson | | 713/324 |
| 6,393,499 B1 | 5/2002 | Chaiken et al. | | 710/19 |
| 6,412,075 B1 | 6/2002 | Klein | | 713/322 |
| 6,446,073 B1 | 9/2002 | D'Amato et al. | | 707/202 |
| 6,647,435 B1 | 11/2003 | Koh et al. | | 710/14 |
| 6,654,827 B2 * | 11/2003 | Zhang et al. | | 710/62 |
| 6,675,233 B1 | 1/2004 | Du et al. | | 710/14 |
| 6,721,489 B1 * | 4/2004 | Benyamin et al. | | 386/46 |
| 6,763,458 B1 * | 7/2004 | Watanabe et al. | | 713/100 |
| 6,819,961 B2 * | 11/2004 | Jacobs et al. | | 700/17 |
| 7,098,899 B1 * | 8/2006 | Ginosar | | 345/204 |
| 2001/0028562 A1 | 10/2001 | Naghi | | 362/85 |
| 2002/0010819 A1 | 1/2002 | Dye | | 710/68 |
| 2002/0068988 A1 | 6/2002 | Chan et al. | | 700/94 |
| 2002/0157001 A1 | 10/2002 | Huang et al. | | 15/177 |
| 2004/0177228 A1 * | 9/2004 | Leonhardt et al. | | 711/170 |
| 2004/0226020 A1 | 11/2004 | Birmingham | | 719/310 |

FOREIGN PATENT DOCUMENTS

| | | |
|---|---|---|
| EP | 0658843 | 6/1998 |
| EP | 0945778 | 9/1999 |
| EP | 0945778 A2 | 9/1999 |
| EP | 0982732 A1 | 3/2000 |
| EP | 1028424 A2 | 8/2000 |
| JP | 10-283195 | 10/1998 |
| JP | 11-119875 | 4/1999 |
| JP | 11-175099 | 7/1999 |
| JP | 2000-105598 | 4/2000 |
| WO | WO 01/61442 A1 | 8/2001 |
| WO | WO 02/45319 A2 | 6/2002 |
| WO | WO 02/45319 A3 | 6/2002 |

OTHER PUBLICATIONS

"How Do I Boot Into Safe Mode?" Laplink.com, [Online] Apr. 18, 2001, XP002449495 Retrieved from the Internet: URL:http://web.archive.org/web/20010418002737/http://laplink.com/support/kb/article.asp?ID=102> [retrieved on Aug. 5, 2007] *the whole document*.

Martin Bock: "Mehrere Betriebsysteme—ein Rechner" [Online] May 1, 2001, XP002449496 Retrieved from the Internet: URL:http://www.archive.org/web/20010501060259/http://www.martin-bock.de/pc/pc-0004.html> [retrieved on Aug. 5, 2007] *the whole document*.

* cited by examiner

LOW POWER DIGITAL AUDIO DECODING/PLAYING SYSTEM FOR COMPUTING DEVICES

This application is a continuation-in-part of U.S. patent application Ser. No. 09/921,171 filed Aug. 2, 2001 entitled "Low Power Digital Audio Decoding/Playing System for Computing Devices", which claims the benefit of provisional application Ser. No. 60/250,899, filed on Dec. 1, 2000, entitled "Low Power Digital Audio Decoding System for Computing Devices"and provisional application Ser. No. 60/265,466, filed on Jan. 30, 2001, entitled "Low Power Digital Audio Decoding/Play System for Computing Machines".

BACKGROUND OF THE INVENTION

1. Field of the Invention

The present invention relates generally to portable devices (e.g., notebook computers) for reproducing audio recordings, and more particularly, to low-power hardware and software for decoding and reproducing compressed audio recordings in a variety of compression formats from a variety of sources. While particular utility for the present application is in the reproduction of MP3 digital audio files, especially for use with portable computers, other utilities are contemplated herein.

2. Description of Related Art

Presently there exist various portable devices for replaying digital audio recordings that have been compressed in accordance with one or more compressed audio digital recording formats, e.g., MPEG (Moving Picture Experts Group) Audio Layer-3 (MP3), Windows® Media Audio (WMA), and Advanced Audio Coding (AAC). To date, the most popular format has been MP3, a compression scheme that results in about a 10:1 compression of the size of digital music files. These devices can be divided into two classes, those which store the compressed digital audio recordings in an electronic solid-state memory, and those which record the compressed digital audio for subsequent reproduction using an electro-mechanical device such as a compact disk ("CD") player or on a hard disk drive of a digital computer.

For example, portable devices for playing MP3 compressed digital audio recordings that use electronic solid-state memory, e.g., flash-memory, are capable of storing about ten (10) music selections. With an add-in memory card, such devices can carry a total of about twenty (20) music selections. These MP3 players that store the MP3 compressed digital audio recordings in an electronic solid-state memory consume comparatively little electrical power. Thus, such MP3 players provide an extended playing interval without having to power the computer's CD-ROM or hard disk drive.

U.S. Pat. No. 6,226,237, entitled "Low Power CD-ROM Player for Portable Computers", issued May 1, 2001 (the "'237" patent), which is hereby incorporated by reference in its entirety, describes how a conventional notebook computer, when simply playing a conventional music CD, consumes an unnecessarily large amount of electrical energy. That is largely due to the large number of background functions that are unrelated to the playing of music that the Operating System (e.g., Windows®) is performing whenever the computer is turned on. That excessive electrical energy consumption for functions unrelated to the function the user is performing at the moment, i.e., playing music, quickly drains the battery of a notebook computer of power that could more prudently be applied at another time in performance of microprocessor intensive tasks such as word processing and spreadsheet analysis. The solution presented in the '237 patent is a state machine that operates when main power to the portable device is OFF. The invention of the '237 patent couples a CD-ROM to the audio subsystem (when main power is OFF) so that CDs can be played, without excessive battery drain, or without having to boot up the portable computer.

The prior art also includes silicon solutions that are dedicated function integrated circuits (ICs) or incorporated into application-specific integrated circuits, or ASICs. These are usually expensive solutions as the digital signal processor (DSP) required in a dedicated chip results in a large, costly integrated circuit. One of the results is the use of a larger amount of PCB (printed circuit board) space.

Further, the 15 to 20 MIPS (million instructions per second) decode engine known in the art must be continuously running to generate the audio stream for the Codec. Additionally, the dedicated decode engine needs to have the high-power-consuming hard disk drive (HDD) continuously operating. These approaches are limited to functioning only with MP3 compression, thereby eliminating the opportunity to adapt the system to newly emerging music compression algorithms, such as Microsoft's WMA or the music industry's proposed Secure Digital Music Initiative (SDMI) for secure audio.

Dedicated silicon solutions known in the art employ a DSP that must constantly be decoding the compressed audio files from a hard disk drive, which must therefore be constantly reading the audio files. Such known methods require much power, resulting in a fast battery discharge, (e.g., much faster than the possible 4 to 10 hours of desired use on a transoceanic flight).

Thus, known hardware MP3 decoder and players requiring an IC implementation and a hard disk drive being accessed non-stop are high in power consumption, difficult to upgrade, and expensive.

The present invention provides a solution that is low in power consumption, can be upgraded in the field for various music compression formats, is expected to cost no more than half the cost of the currently available hardware implementation, and may be made capable of playing up to hundreds of musical selections, while only having to access the HDD or CD-ROM less than 0.5% of the time.

SUMMARY OF THE INVENTION

It is becoming more and more desirable for mobile platform companies to add MP3 and other compressed audio player capability to their products, with low cost, while providing very long music playing time, and perhaps even a player that can be later upgraded to other compression formats by the owner. These mobile platform companies may also want to market differentiate their products within a very short development time frame.

The music playing solution of the present invention utilizes a special purpose circuit in combination with the mini-OS (operating system) software of the present invention. The present invention uses the embedded computing power of the standard CPU to perform the file decompression. Since today's CPUs with clock rates of 500 MHz to 1 GHz have at least an order of magnitude higher processing power than the real time DSP engines used in currently available MP3 player/decoders, these powerful CPU processors can often finish the decoding process in less than 10% of the available time. The CPU may then be set to idle by the present invention for more than 90% of the time, saving large amounts of power and thus greatly slowing the discharge of the battery and extending the useful time of the equipment under battery power on a single charge.

The present invention is unlike the real-time DSP engines known in the art, which require a constant data stream from the HDD, and which result in high power consumption, since the HDD is being accessed all the time. Using the technology of the present invention, the HDD may be accessed less than 0.5% of the time with a typical complement of memory, i.e., 128MB RAM. This results in a dramatic reduction in the rate at which power is dissipated from the equipment battery. Further, minimal PCB changes are required for the present invention, thus resulting in the quick adoption of new product features in PCs.

There are many possible music compression algorithms. Compression algorithms other than MP3 include WMA, AAC, and the proposed SDMI. The software decompression methodology of the present invention can be easily modified to decode any compression scheme, or with a software installation process, all the various compression schemes. This flexibility allows the adaptation to new and different algorithms, as they become popular, by permitting an after-market upgrade of computers equipped with the present invention. Also, since this portion of the present invention is a software system, new updates and/or algorithms may be downloaded (e.g., from the Internet) to upgrade machines in the field, eliminating the necessity for consumers to buy multiple players/decoders in order to listen to audio files having different compression formats.

Thus, the present invention provides a low-cost, low power-consumption, long-battery-life audio playing and decoding system, which may be used to play audio files of various formats.

In one aspect, a computer system adapted to play audio files comprises a system CPU, memory; at least one drive comprising compressed audio data residing in one or more audio files, a play list software program for selecting and storing a play list comprising one or more of the audio files, a first operating system adapted to control at least the system CPU and memory, and a second operating system stored in BIOS and adapted to retrieve the play list and cause the drive to read at least one audio file of the play list, to cause the system CPU to decompress the compressed audio data of the file and provide decompressed audio data, and to cause the decompressed audio data to be stored in memory.

In another aspect, a computer system adapted to play audio files comprises a drive comprising at least one audio file, an audio controller, and an operating system stored in BIOS, the operating system controlling the audio controller, so as to cause the audio controller to play at least one audio file.

In a further aspect, a computer system adapted to play audio files comprises: compressed audio data, a system CPU, an audio controller, a first operating system adapted to control at least the system CPU, a second operating system controlling the audio controller and system CPU, so as to cause the system CPU to decompress the compressed audio data, and a switch, the activation of the switch causing the second operating system to boot.

In yet another aspect, a computer system adapted to play audio files comprises a system CPU, memory, at least one drive comprising compressed audio data residing in one or more audio files, a play list software program for selecting a play list comprising one or more of the audio files, and an audio controller coupled to the system CPU, memory and drive. The audio controller is adapted to cause the drive to read at least one audio file of the play list, to cause the system CPU to decompress the compressed audio data of the file and thereby provide decompressed audio data, and to cause the decompressed audio data to be stored in memory.

In process form, a method of playing audio files on a computer system comprises: booting a first operating system; creating and storing a play list comprising a list of compressed audio files residing on one or more drives of a computer system having at least a drive, a CPU, and a memory; terminating the first operating system; booting a second operating system upon activation by a switch; reading the play list; reading the compressed audio files from the drive based on the play list; providing the compressed audio data to the CPU for decompressing the data of the compressed audio file into decompressed audio data; storing the decompressed audio data in memory; and retrieving the decompressed audio data from the memory for playing.

In another process form, a method of playing audio files on a computer system comprises: reading compressed audio data from the drive of a computer system having at least a drive, a CPU, and a memory; providing the compressed audio data to the CPU for decompressing the compressed audio data, thereby providing decompressed audio data; and storing the decompressed audio data in memory.

DETAILED DESCRIPTION OF EXEMPLARY EMBODIMENTS

The present invention comprises mini-OS (operating system) software and a hardware interface between the South Bridge and Codec to play the musical selections (or other stored audio) desired by the user. The mini-OS software of the present invention performs only those functions and enables those elements of the portable computer that are needed, when they are needed, to play the selected music, without performing all of the background functions performed by the full system operating system, e.g., Windows®, and without accessing the monitor circuitry and monitor screen of the portable computer. Additionally, the mini-OS of the present invention only accesses the HDD when compressed files are being transferred to RAM. Thus, it will be seen that the mini-OS software portion of the present invention performs both power saving and file management functions when playing audio.

Figure 1:
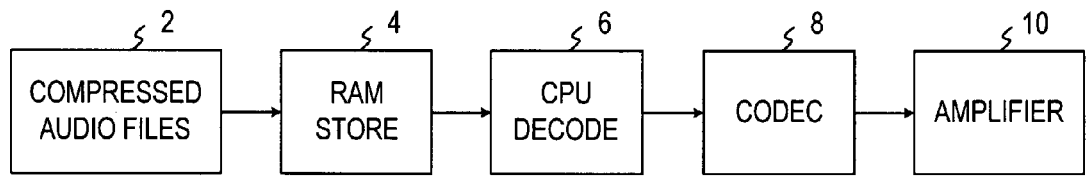
FIG. 1 is a block diagram representation an exemplary operational flow of one embodiment of the present invention.

FIG. 1 is a block diagram representation of the operational flow of the exemplary software compressed audio player in one embodiment of the present invention.

The operational concept illustrated in FIG. 1 is as follows:

$1^{st}$: A browser, running on a full system operating system, e.g., Windows®, of the portable computer is initially used to download compressed music files (for example 1000 songs) onto the PC hard disk drive (HDD) (2) (e.g., using 4 gigabytes of HDD space) at some time prior to the time at which the user desires to use the portable computer as an audio player and a playlist is created, comprising the songs the user desires to hear at a later time;

$2^{nd}$: When the user desires to use the portable computer as an audio player, once the desired music files are on the HDD, the user operates an audio player on-switch to turn the portable computer fully on, boot up the entire computer, load in the mini-OS of the present invention instead of the usual Microsoft Windows® OS (the full system operating system is not opened) with the power saving initialization subroutines and initializes only those portions of the portable computer as necessary, and the file management subroutines initialize the song play list or book generated in step 1, of a substantial number of songs, for desired music listening under direction of the user;

$3^{rd}$: The mini-OS software is then copied from the HDD (2) to RAM (4), and then the first set of compressed files from the song play list is copied from the HDD (2) to the system RAM (4) also using the mini-OS software of the present invention. For example, in today's PC's 128 Mbytes is a typical system RAM size, with the mini-OS software of the present invention taking about 8 Mbytes of the RAM, leaving approximately 120 Mbytes for use as a compressed music memory (i.e., a cache or buffer, using system memory, dedicated memory, or other memory). That 120 Mbytes represents about 2 hours of continuous compressed music with a compression ration of 10:1, typical of MP3 files. Similarly, in the case when flash media is used for MP3 storage, all or most of the contents of the flash media card can be copied to the system RAM (4), thus minimizing the access of the flash media reader and allowing for a more responsive control over the MP3 files;

$4^{th}$: The file management software of the present invention sequentially delivers portions of the first music file to the CPU (6) where the decode algorithm decompresses each file using the file management software of the present invention stored in RAM (4). Once decoded, the PCM audio data is transferred in one of three ways: the CPU delivers the PCM audio data to the South Bridge (see FIG. 3 (32)) FIFO buffer; the DMA in the South Bridge transfers the data internally within the South Bridge to the FIFO buffer; or the special purpose circuit transfers the data to the FIFO buffer from the LPC interface. The FIFO buffer then sequentially feeds each piece of decoded music to Codec (8) (also see FIG. 3 (42)), through the special purpose circuit of the present invention, where the decoded signal is converted from digital to analog. Then the output signal from the Codec (8) is amplified (10) (also see FIG. 3 (44)) to drive the speakers and/or headset (see FIG. 3 (46)).

$5^{th}$: While the final song of the first set from the play list is playing from memory, the file management software of the present invention stored in the RAM (4, 30) returns control to the $4^{th}$ step to retrieve the next set of compressed music files from the memory of the RAM, as determined by the earlier scripted song play list developed in the $1^{st}$ step. Thus, the $4^{th}$ and $5^{th}$ steps are repeated for each set of compressed music files until the last music selection in the set plays. At that point in time control returns to the $3^{rd}$ step to load another set from the play list, which is similarly played through the $4^{th}$ and $5^{th}$ steps. When the last song is played from the overall play list of the $2^{nd}$ step, or when the user turns off the music player function, the operation of the player ceases.

The mini-OS power saving software of the present invention ensures that the CPU, Peripheral Chips, HDD and other controllable system elements will be in idle state for the highest percentage time possible. An interesting attribute of the solution offered by the present invention is that the higher the MIPS (Million Instructions Per Second) capacity of the CPU, the smaller percentage of time the CPU will spend performing the decode function. This means that higher performance CPU's will demonstrate even lower power usage when playing compressed music performances, thus saving even more battery power and further extending the length of time that the battery maintains sufficient charge to power the portable computer.

The mini-OS monitors the audio control buttons (e.g., play, fast forward, rewind, pause, scan, previous track, next track, first track, last track, fast forward/rewind while listening, audio source/media select (e.g., HDD or CD), etc.) (see FIG. 3 (48)) for user actuation through the special purpose circuit (see FIG. 3 (40)) of the present invention, and communicates user requests to the mini-OS file management software of the present invention. Optionally, a small LCD display (see FIG. 3 (34)) can be connected to the special purpose circuit to provide visual status indicators (e.g., Song #, Song titles, track #, Playtime & icons) under control of the mini-OS display management subroutines.

The mini-OS power saving software of the present invention primarily manages the usage of the CPU, and the MP3 storage devices such as CD, HDD, and flash media such as SD (Secure Digital) cards, MMC (Multimedia Card), memory stick, and SMC (Smart Media Card), while maintaining the rest of the system, including the memory, corelogic chipsets, in a fully on and functional state. Secondary power saving is applied to other PC subsystems to minimize power usage still further by putting them in an idle state.

Figure 3:
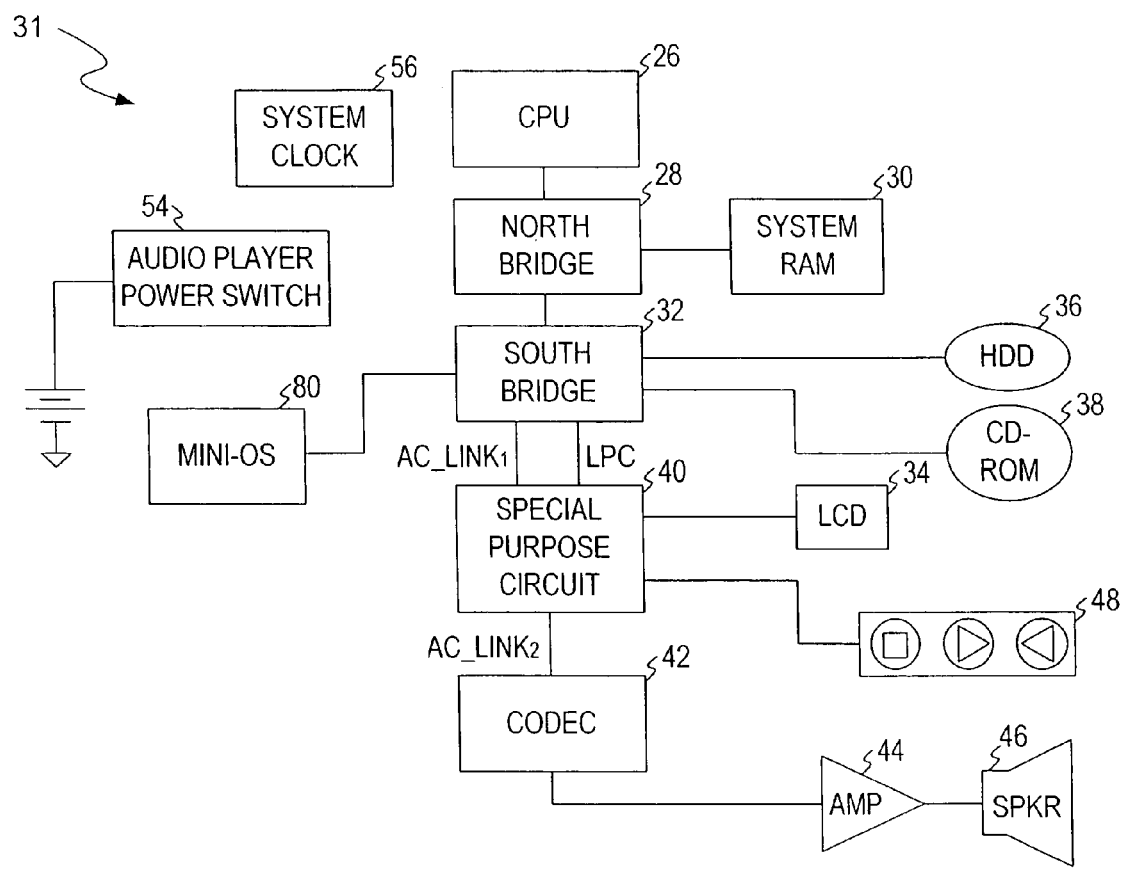
FIG. 3 is a block diagram of an exemplary audio player system consistent with one embodiment of the present invention.

For example, with a 500 MHz Pentium III CPU having about 225 MIPS of processing power and the decode algorithm requiring about 15 MIPS, the CPU will be operating less than 10% of the time. The other 90-95% of the time the CPU will be in a standby mode that requires only milliamps of current. Alternatively, the CPU can be run at a slower clock speed, which is usually an option provided by most of today CPUs, such as the AMD's Athlon CPU. Similarly the HDD is accessed during the time it takes to fill or refill the RAM. Thus, since the average song takes about 4 minutes to play and the RAM holds about 30 songs for 120 Mbytes, and since the HDD needs 1-5 seconds to spin up and only several seconds to load the song play list into RAM, the total access time for the HDD may be 30 seconds out of 120 minutes of play time; a ratio of 1:240, less than 0.5% of fall power operating time. These factors add to the power savings gained by using the mini-OS of the present invention instead of the full operating system of the portable computer. The result of the overall power consumption of the present invention is very low when the portable computer is in the music play mode, and that directly translates into the battery maintaining a useful charge level for a much longer time than allowed by the prior art. As those skilled in the art will recognize, the compressed music data of this invention may reside on a hard disk, on other magnetic (e.g., tape) media, optical (e.g., CD-ROM) media, flash media (e.g., SD cards, MMC, memory stick, SMC), or any other storage medium. FIG. 3 is a generalized overall block diagram of an exemplary system 31 consistent with one embodiment of the present invention. The majority of the blocks in system 31 are components known in the art and are generally included in all PC computers for producing sound through the speaker of the computer. Shown here is a system clock 56, which, for simplicity of FIG. 3, is not shown connected to the various components that need a clock signal. Additionally, CPU 26 is shown interfacing with North Bridge 28. In turn, North Bridge interfaces with system RAM 30 and South Bridge 32. Then South Bridge 32 interfaces with HDD 36 and CD-ROM 38. Typically South Bridge 32 also interfaces directly with Codec 42 through AC_link; however, in the exemplary system 31 shown, special purpose circuit 40 (see discussion of FIG. 4 below) is inserted between South Bridge 32 and Codec 42 to enable the playing of compressed digital audio in conjunction with the mini-OS 80 of the present invention from system RAM 30, without affecting the ability to play non-compressed analog audio. In this configuration, the mini-OS 80 is stored in the BIOS, although those skilled in the art will recognize that the mini-OS could alternatively be stored in its own ROM (either within special purpose circuit 40 or external to it), a hard disk, or other media. Thus, AC_link, from South Bridge 32 is coupled to special purpose circuit 40, which performs the decompression function as necessary, and then provides any audio signals to Codec 42 via AC_link$_2$. Codec 42 then performs the usual function on all signals received from special purpose circuit 40 and applies the audio signals to amplifier 44, to be played on speaker 46 or headphones (not shown). In system 31, AC_link$_1$ looks and behaves like the standard AC_link to South Bridge 32, and AC_link$_2$ looks and behaves like the standard AC_link to Codec 42, making it appear to those portions of the computer that audio functions are being performed as during normal (i.e., known in the art) audio play, thus having minimal or no impact on the operation of South Bridge 32 and Codec 42. Also shown in FIG. 3 are function switches 48, small LCD display 34 and audio player power switch 54, which function as described hereinbelow with reference to FIG. 4.

Figure 4:
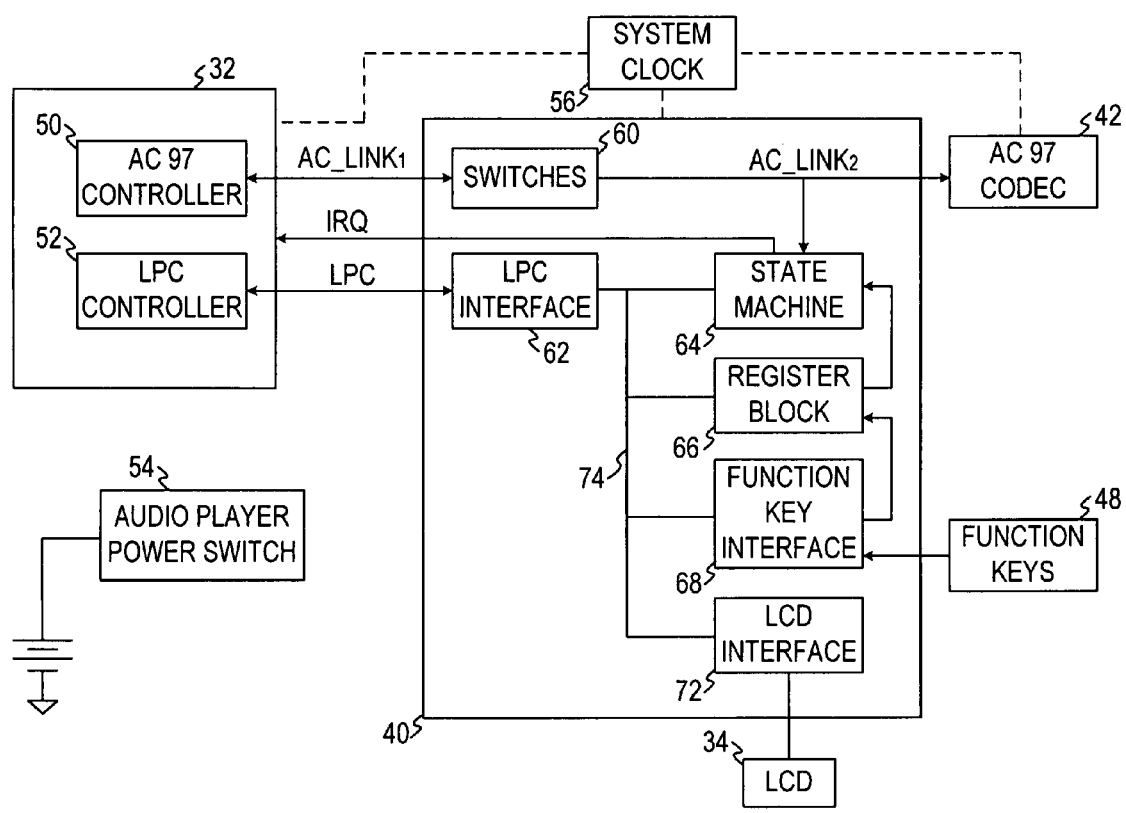
FIG. 4 is a block diagram of the internal portion of an exemplary special purpose circuit, in relation to the other components that interface with it, in one embodiment of the present invention.

FIG. 4 includes a detailed block diagram of the internals of special purpose circuit 40 and related details of the other portions of the computer that the special purpose circuit interfaces without showing all of the details of the rest of the computer system. Special purpose circuit 40 may be produced as an IC to minimize the PCB space needed to incorporate embodiments of the present invention into portable computers. South Bridge 32 is shown with the standard AC97 controller 50 and LPC (low pin count) controller 52 to the left of special purpose circuit 40 with the standard bidirectional links AC_link$_1$ and LPC Bus between them, and the unidirectional IRQ (Interrupt Request) link from special purpose circuit 40 to South Bridge 32. To the right, special purpose circuit 40 provides uncompressed audio to AC97 Codec 42 via AC_link$_2$. Also, to the right, function keys 48, and below LCD 34, are each shown connected to special purpose circuit 40. Additionally, FIG. 4 includes system clock 56 connected to various components, and in the lower left, audio player power switch 54. Power switch 54 is provided so that when the user initiates the player mode via power switch 54, only the mini-OS (instead of the full system OS) is initiated, for use in a system consistent with the present invention.

Internal to special purpose circuit 40 are switches 60 that interface with both AC_link$_1$ and AC_link$_2$ and function in response to settings in an internal register of register block 66, with switches 60 closed connecting AC-link, with AC_link$_2$ when the PC functions normally with the full system OS, and with switches 60 open when a system consistent with the present invention is employed. The LPC path is coupled to LPC interface. Switches 60 and AC_link$_2$ are coupled to state machine 64, while another port of state machine 64 is coupled, via bus 74, to the output of LPC interface 62, as well as register block 66, function key interface 68 and LCD interface 72. A second port of register block 66 is also coupled to a third port of state machine 64. Function keys 48 are coupled to function key interface 68, and LCD 34 is coupled to LCD interface 72. Also, function key interface 68 provides a signal to register block 66 when one of the function keys 48 is selected by the user. Audio player power switch 54, which is operated by the user in the second step discussed above, may be used to activate the PC to operate as described hereinabove. Switch 54 is shown connected to the DC voltage source of the portable computer and not to any particular block in FIG. 4, since that connection varies depending on several factors controlled by the manufacturer of the computer on which an embodiment of the present invention is installed.

More specifically, the blocks within special purpose circuit 40 operate as follows:

LPC Interface

Special purpose circuit 40 includes LPC (Low Pin Count) interface 62 to interface with LPC controller 52 in South Bridge 32.

The LPC interface 62 is used to by CPU 26 to:
(1) read the function key input registers in register block 66;
(2) set the control register in register block 66 to control the AC97 Codec 42;
(3) get the audio PCM (Pulse Code Modulation) data from the system memory (RAM 30); and
(4) perform clock throttling control.

The setting in the mode register of register block 66 controls the state of switches 60 to switch the special purpose circuit 40 between the normal computer operation mode with switches 60 closed (e.g., running Microsoft Windows® OS) and the mode of a system consistent with the present invention, with switches 60 open (running the mini-OS) to play compressed audio files.

South Bridge AC97 Controller 50 Interface (AC_Link$_1$ from Host)

During the normal computer operation mode, switches 60 are closed with the South Bridge AC97 Controller 50 interface connected directly through, closed switches 60, to AC97 Codec 42 to generate audio output as if special purpose circuit 40 were not present. To play compressed audio files, switches 60 are open when the mini-OS is running, and state machine 64 controls AC97 Codec 42.

AC97 Codec Interface (AC—Link$_2$ to AC97 Codec 42)

When the computer is running under control of the mini-OS, switches 60 are open. State machine 64 then controls the AC_link$_2$ in response to the settings of the register block 66 set by the host (CPU 26) to generate the controls for AC97 Codec 42 (e.g., switching the sampling frequency, controlling volume, sending the PCM data to the Codec 42, setting the Codec 42 to the power saving mode or waking Codec 42 from the power saving mode).

Function Key Input Interface 68

Function key interface 68 receives the user selections from function keys 48 and stores the selections in internal registers to be read by CPU 26.

LCD Interface 72

LCD interface 72 is only necessary if LCD 34 is used to provide status information to the user. The purpose, when used, is to show player status on low cost LCD 34 when the system consistent with the present invention is used. Status of the audio track number of the selection playing, status icons (e.g., Play) and other generic status icons may be programmed into the system and displayed for any other purpose.

Operation Modes (A) Normal Operation Mode:

When the PC is fully powered and running under the full system OS, the various functions of special purpose circuit 40 are bypassed and switches 60 are closed, as discussed above. In the normal mode, the computer system uses the South Bridge AC97 Controller 50 to directly control the AC97 Codec 42 through the AC_link (in the Normal mode $AC\_{link1}$ and $AC\_{link2}$ are the same since switches 60 are closed). The special purpose circuit does not intercept or modify the AC_link signals.

(B) Compressed Audio Performance Mode:

When switch 54 has been closed, the system runs under the control of mini-OS, and special purpose circuit 40 is empowered and runs in the compressed audio performance mode. The South Bridge AC97 Controller 50 is isolated from the AC97 Codec 42 in this mode since switches 60 are open.

In the compressed audio performance mode, the host (CPU 26) sets the internal registers of register block 66 to control the data flow to the AC97 Codec 42, and to perform the various power management functions.

A Power Saving Control Method in Compressed Audio Performance Mode

A flexible control method of the special purpose circuit 40 is provided to minimize the system control cycles and power consumption in the performance mode. The system memory (RAM 30) is used to pass most of the control commands to the special purpose circuit 40, instead of CPU 26, which minimizes the time that CPU 26 needs to access high speed external bus other than a standby level. This considerably reduces the power load on the portable computer battery in this mode.

CPU 26 also sets the system control memory registers in register block 66. State machine 64 bases operation on those register settings to obtain control words and PCM data automatically through the LPC interface 62. The control words in the system memory (RAM 30) are fetched into the internal registers, and the state machine 64 decodes the control words to determine if PCM or audio data is ready. If the audio data is ready, the state machine 64 continues to fetch the audio data and send it to the AC97 Codec 42. The control words in the system memory (RAM 30) can also be used to indicate the sampling frequency of the PCM data. So, the state machine 64 can set AC97 Codec 42 to the appropriate frequency before the PCM data is sent.

Those skilled in the art will recognize that a headphone or headset system may comprise further functionality than described hereinabove, e.g., a volume control, or the audio control buttons may be integrated thereto.

It should also be recognized that a special purpose circuit consistent with the invention may be integrated into a full-time compressed (and/or non-compressed) audio playing system capable of playing music regardless of the operation of the rest of the system. In this configuration, the special purpose circuit and mini-OS are provided, as well as a software driver for handling interrupts from the function buttons under Windows®. In this configuration, when the rest of the system is either fully on (S0) or in "sleep" (suspend to RAM or S3) mode, the system may be configured to begin execution of a custom or standard audio player, e.g., Music Match or Windows® Media Player, running under Windows®, which may be adapted to play the compressed audio files stored in the play list. In this scenario, the function buttons may be adapted for use in a passthrough-type mode using the accompanying software driver to control various features of the audio player software, e.g., Music Match, instead of controlling the special purpose circuit. When the primary operating system such as Windows® is either fully off (S5) or in "hibernate" (suspend to HDD or S4) mode, operation of the special purpose circuit may proceed to play compressed audio files from the play list as described hereinabove, wherein the function buttons control the special purpose circuit.

It is noted that the power states described above (i.e., fully on, sleep/suspend to RAM, fully off, hibernate/suspend to HDD) are often referred to using the Advanced Configuration and Power Interface ("ACPI") standard conventions, as follows: The typical operating system (e.g., Windows®) supports six system power states, referred to as S0 (fully on and operational) through S5 (power off). Each state is characterized by the following: power consumption, i.e. how much power the computer uses; software resumption, i.e, from what point the operating system restarts; hardware latency, i.e., how long it takes to return the computer to the working state; and system context, i.e. how much system context is retained, or whether the operating system must reboot to return to the working state. State S0 is the working state. States S1, S2, S3, and S4 are sleeping states, in which the computer appears off because of reduced power consumption but retains enough context to return to the working state without restarting the operating system. State S5 is the shutdown or off state. A system is waking when it is in transition from the shutdown state (S5) or any sleeping state (S1-S4) to the working state (S0), and it is going to sleep when it is in transition from the working state to any sleep state or the shutdown state. the system cannot enter one sleep state directly from another; it must always enter the working state before entering any sleep state. For example, a system cannot transition from state S2 to S4, nor from state S4 to S2. It must first return to S0, from which it can enter the next sleep state. Because a system in an intermediate sleep state has already lost some operating context, it must return to the working state to restore that context before it can make an additional state transition.

Figure 2:
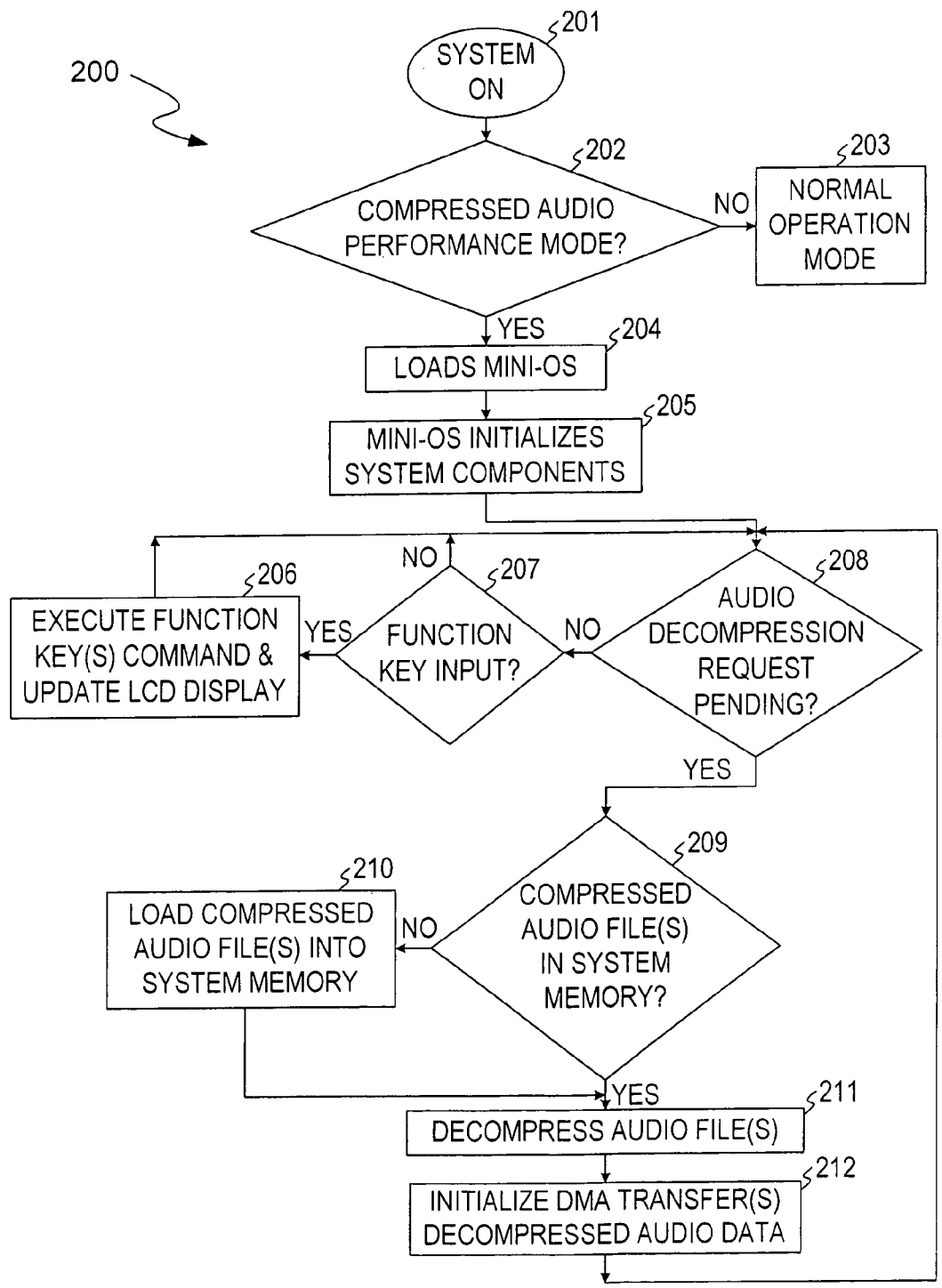
FIG. 2 is a flow diagram of an exemplary power up of the mini-OS and initiation of the player function, in one embodiment of the present invention.

Referring now to FIG. 2, in conjunction with FIG. 3, an exemplary sequence 200 for the power up of the mini-OS and initiation of the player function, in one embodiment of the present invention, is illustrated. As stated above, at some time prior to the initiation of the audio player function of a PC equipped with the present invention, the user downloads (not shown in FIG. 2) the audio files of interest to the HDD 36 or burns a CD-ROM that is placed in the CD-ROM drive 38 for use with the audio player feature of the present invention. As shown, at step 201, the sequence 200 begins when the user presses either an audio player power switch 54 or the computer's main power switch (not shown in FIG. 3), to turn the system on. A determination is then made, at step 202, whether the computer is to boot in normal operation mode or compressed audio performance mode. This determination is typically made in the BIOS, based on whether the computer's power switch or an audio player power switch 54 was used to turn on the computer, although those skilled in the art will recognize that this determination could alternatively be made by an application program or an operating system that provides such capability (e.g., Windows®98). If the computer's power switch was used to turn on the computer, then the system boots to normal operation mode, at step 203, and the normal operating system (e.g., Windows®98) is loaded into system RAM 30 and executed. If an audio player power switch 54 was used to turn on the computer, the mini-OS is loaded into system RAM 30, at step 204. At step 205, the mini-OS initializes the system components including one or more of the North Bridge 28, South Bridge 32, special purpose circuit 40, hard drive 36, CD-ROM drive 38, codec 42, and CPU 26.

Since no audio decompression request will be pending upon system initialization (i.e., the memory buffer is not full), which determination is made at step 208, the system waits for input from one of the function keys 48, at step 207, until one of the function keys 48 is pressed, at which point the appropriate function is executed and the LCD display updated, as appropriate, at step 206. If the command includes a request from the user to play audio, an audio decompression request will be pending at this time, which determination is made at step 208. Since no compressed audio file(s) are in system memory 30 upon the initial request to play audio, which determination is made at step 209, the compressed audio file(s) are read from the HDD 36 and/or CD-ROM drive 38 and loaded into system memory 30, at step 210. After the compressed audio files are loaded into system memory at step 210, or if the audio file(s) are already in system memory, which determination is made at step 209, the audio files are then decompressed, at step 211, using the system CPU 26. DMA transfer(s) to the codec 42 are initialized for the decompressed audio data, at step 212, and then the output signal from the Codec 42 is amplified (not shown in FIG. 2) by the amplifier 44 to drive the speakers and/or headset 46. After the DMA transfer(s) are initialized, at step 212, control loops back to step 208, to determine whether an audio decompression request is pending.

Playlist Software Operation

Figure 5:
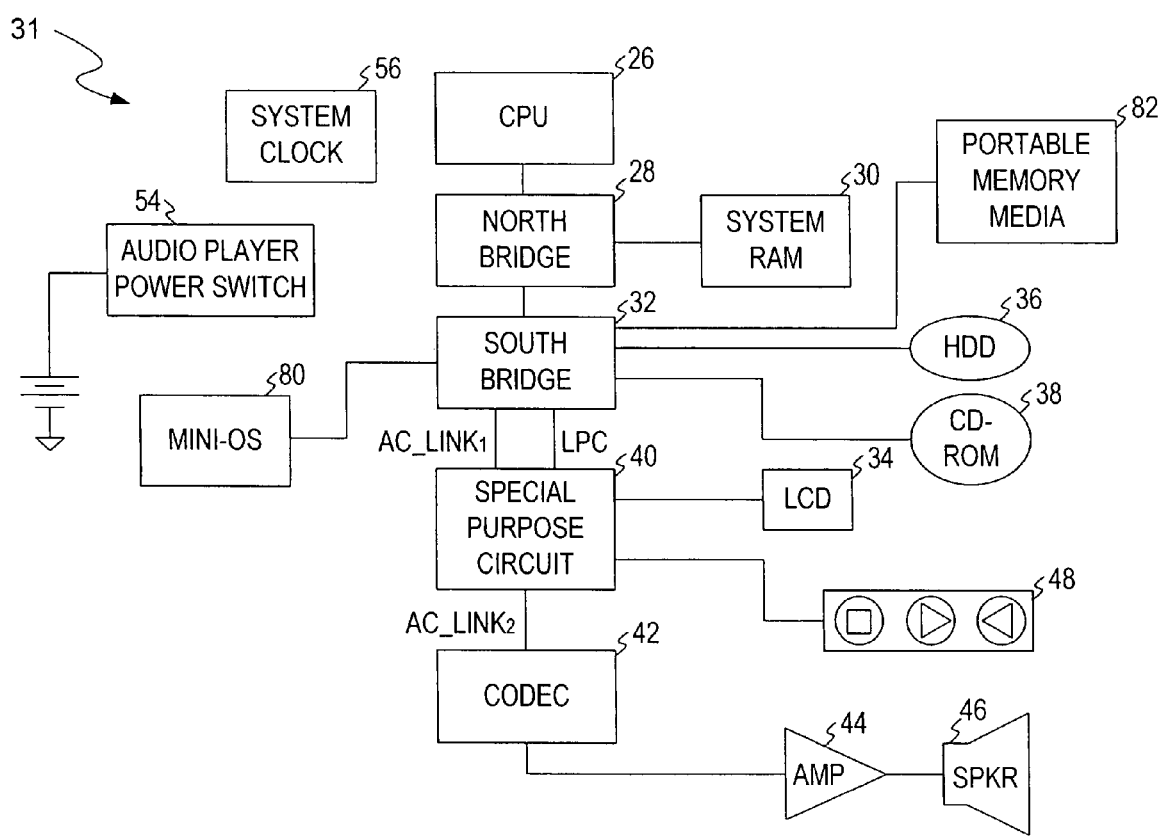
FIG. 5 is another block diagram of an exemplary audio player system consistent with another embodiment of the present invention.

FIG. 5 is another generalized overall block diagram of an exemplary system 31 consistent with another embodiment of the present invention. In this exemplary embodiment, the system 31 includes portable memory media 82 that can be used to hold the playlist data and/or compressed file data. The memory media 82 can be SmartCard media, Memory Stick media, PCMCIA memory media and/or other portable media known in the art. If the system is ON and media is detected as being present at the portable memory media location (e.g., by insertion of a Smart Card, PCMCIA, CardBus card, Memory Stick or other media into an appropriate slot), the memory reader generates an interrupt to the South Bridge 32. The special purpose circuit 40 of this embodiment also receives the interrupt and generates a command to tell the operating system to launch an appropriate application (e.g., Windows Media Player) to read the playlist data on the memory device 82. In this instance, the application takes control to read the playlist file and retrieve the audio data, either from the memory device 82 or some other location specified in the playlist file. Similarly, when the mini-OS is operational, the special purpose circuit 40 is adapted to check if a memory device 82 is present, and to scan the device for playlist data. The system then operates as described above.

The playlist file, as described herein, is a generalized data file that is constructed by a user having a desired MP3 song sequence. The playlist file also includes disk path information to instruct the application as to where to locate the desired MP3 data. Certain operating systems permit users to change drive letters on-the-fly. Accordingly, the playlist software reads the volume serial number (VSN) given by the operating system to a particular drive. The serial number does not change (unless intentionally changed by reformatting the drive), and thus, the playlist software can track the playlist data regardless if the user reassigns a particular drive letter. This feature also works similarly with switchable devices such as disk drives.

It should be recognized by those skilled in the art that, although the above-described embodiments utilize a hardware-based OS selection (i.e., pressing main power button boots to Windows®, while pressing audio control button boots to mini-OS), other OS selection methods are contemplated, as well. Such selection methods include, e.g., using a batch file or other scripting or software-based method to shut down a first OS and boot to the second OS. Those skilled in the art will also recognize that the mini-OS of the present invention could conceivably be implemented as part of a larger OS (e.g., a GUI-based OS, such as Windows®, LINUX, etc.) or as a software component named something other than an "operating system", (e.g., a "driver", an "algorithm", a "script", "code", a "program", an "executable", a "routine", a "subroutine", a "utility", etc.), instead of being implemented as an entirely separate operating system. Such embodiments are contemplated to be within the scope of the present invention.

Although the present invention has been described in terms of the exemplary embodiments provided herein, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A computer system adapted to play an audio file, said computer system comprising:

a system CPU;

a memory coupled to said system CPU; and a drive coupled to said system CPU and having stored thereon an audio file comprising compressed audio data;

wherein a first operating system is adapted to control at least said system CPU and said memory, wherein said first operating system is operable for decompressing said compressed audio data if said computer system is operated by said first operating system; and wherein a second operating system is stored in BIOS and is used instead of said first operating system for retrieving a play list containing information related to a location of an audio file including a volume serial number of a drive containing said audio file, and for enabling said drive to read said audio file from said play list according to said volume serial number, and for enabling said system CPU to decompress said compressed audio data, wherein decompressed audio data is transferred through a first transfer path to an output amplifier through a circuit situated between said drive and said output amplifier if said computer system is operated by said first operating system, and wherein said decompressed audio data is transferred through a second transfer path through said circuit to said output amplifier if said computer system is operated by said second operating system, wherein on said first transfer path said decompressed audio data is not modified by said circuit but on said second transfer path play of said decompressed audio data is controlled using user-actuated function keys that are coupled to said circuit.

2. The computer system as claimed in claim 1, further comprising a portable memory media device coupled to said system CPU, wherein said portable memory media device comprises a portable memory media reader and a portable memory device, and wherein said play list is stored on said portable memory media device.

3. The computer system as claimed in claim 2, wherein said portable memory media device is selected from the group consisting of a Smart Card, a PCMCIA, a CardBus card and a Memory Stick.

4. A computer system adapted to play at least one audio file, said computer system comprising: audio file, said computer system comprising:
- a system CPU;
- a memory coupled to said system CPU; and
- a first device coupled to said system CPU and having stored thereon an audio file comprising compressed audio data;
- wherein a first operating system is adapted to control at least said system CPU and said memory and is executed when said computer system is operating in a first mode, said first operating system adapted to decompress said compressed audio data if said computer system is operated by said first operating system; and
- a second operating system is executed instead of said first operating system when said computer system is operating in a second mode, said second operating system operable for retrieving a play list, and for enabling said drive to read said audio file from said play list, and for enabling said system CPU to decompress said compressed audio data of said audio file and to provide decompressed audio data, wherein said decompressed audio data is transferred through a first transfer path to an output amplifier through a circuit situated between said first device and said output amplifier if said computer system is operated by said first operating system, and wherein said decompressed audio data is transferred through a second transfer path through said circuit to said output amplifier if said computer system is operated by said second operating system, wherein on said first transfer path said decompressed audio data is not modified by said circuit but on said second transfer path play of said decompressed audio data is controlled using user-actuated function keys that are coupled to said circuit.

5. The computer system as claimed in claim 4, wherein said play list includes information related to a location of said audio files, and wherein said information comprises a volume serial number of said first device.

6. The computer system as claimed in claim 4, further comprising a portable memory media device coupled to said system CPU, and wherein said portable memory media device comprises a portable memory media reader and a portable memory device, and wherein said play list is stored on said portable memory media device.

7. The computer system as claimed in claim 6, wherein said portable memory media device is selected from the group consisting of a Smart Card, a PCMCIA, a Card Bus card and a Memory Stick.

8. The computer system as claimed in claim 1, wherein said circuit is configured by said system CPU to receive at least one control command if said computer system is operated by said second operating system, wherein said decompressed audio data is transferred through said circuit to said output amplifier in response to said at least one control command.

9. The computer system of claim 8, wherein said circuit is operable to provide a signal to enable said system CPU to change from a first power state to a second power state if said computer system is operated by said second operating system.

10. The computer system of claim 8, wherein said at least one control command is received by said system CPU by bypassing said circuit if said computer system is operated by said first operating system.

11. The computer system as claimed in claim 4, wherein said circuit is configured by said system CPU to receive at least one control command if said computer system is operated by said second operating system, wherein said decompressed audio data is transferred through said circuit to said output amplifier in response to said at least one control command.

12. The computer system of claim 11, wherein said circuit is operable to provide a signal to enable said system CPU to change from a first power state to a second power state if said computer system is operated by said second operating system.

13. The computer system of claim 11, wherein said at least one control command is received by said system CPU by bypassing said circuit if said computer system is operated by said first operating system.

* * * * *